(12) United States Patent
Egawa

(10) Patent No.: US 6,561,662 B2
(45) Date of Patent: May 13, 2003

(54) SPREAD ILLUMINATING APPARATUS

(75) Inventor: Motoji Egawa, Iwata-gun (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 10/046,766

(22) Filed: Jan. 17, 2002

(65) Prior Publication Data

US 2002/0093808 A1 Jul. 18, 2002

(30) Foreign Application Priority Data

Jan. 17, 2001 (JP) ........................................ 2001-008966

(51) Int. Cl.⁷ ............................................... G01D 11/28
(52) U.S. Cl. ......................... 362/27; 362/26; 362/31; 362/332
(58) Field of Search .............................. 362/26, 27, 31, 362/330, 331, 332; 349/58, 67, 65

(56) References Cited

U.S. PATENT DOCUMENTS 3,737,644 A * 6/1973 Nocek et al. .................. 362/26
6,283,602 B1 * 9/2001 Kawaguchi et al. ........... 362/31

* cited by examiner

Primary Examiner—Sandra O'Shea
Assistant Examiner—Sharon Payne
(74) Attorney, Agent, or Firm—Oliff & Berridge, PLC

(57) ABSTRACT

There is provided a spread illuminating apparatus aiming to minimize the coverage of a liquid crystal screen while securely integrating a light conductive member with a transparent substrate. The light conductive member is wedge-shaped in which the width thereof is in inverse proportion to the increase in distance from a spot-like light source opposing face, and the transparent substrate is trapezoid-shaped in which a side aligned to the spot-like light source opposing face is shorter. A frame and transparent substrate overlapping part becomes larger from one side part to the other side part of the transparent substrate. Since the frame and transparent substrate overlapping part are large enough regardless of the small width of the frame than that of the prior art, the region of a liquid crystal screen can be increased accordingly.

8 Claims, 4 Drawing Sheets

SPREAD ILLUMINATING APPARATUS

BACKGROUND OF THE INVENTION

1. Field of the Invention

The present invention relates to a spread illuminating apparatus, and more particularly to the spread illuminating apparatus used as an illuminating means for a liquid crystal display device.

2. Description of the Related Art

A demand for a liquid crystal display device operating in a low power consumption is increasing mainly for personal computers or portable telephones due to its low profile and light weight. Since a liquid crystal of the liquid crystal display device does not emit light by itself unlike a light emitting element such as a cathode-ray tube, a separate illuminating means is required besides the liquid crystal display device when observing images. In particular, a spread illuminating apparatus of side light type (light conductive plate type) is used as an illuminating means for the liquid crystal display device so as to satisfy the recent demand for the low profile as well as energy saving.

FIG. 4 shows an example of such a spread illuminating apparatus of side light type.

In FIG. 4, a spread illuminating apparatus 1, which includes a rectangular transparent substrate made of a light transmissible material, generally comprises a bar-like light source 4 disposed along one end face 3 of a transparent substrate 2 made of a light-transmissible material. The transparent substrate 2 formed into a plate-like rectangle has a light reflection pattern 5 on a surface (an upper side in FIG. 4).

The light source 4 is generally composed of a bar-like light conductive member 6 made of a transparent material and disposed close to and along the one end face 3 of the transparent substrate 2, and a spot-like light source 7 disposed on one end face of the light conductive member 6.

An optical path conversion means 8 is provided on the light conductive member 6. The optical path conversion means 8 comprises a plurality of grooves 9 which are, for example, triangular in section, and extended in the thickness direction (the vertical direction in FIG. 4) of the light conductive member 6, and formed in the longitudinal direction of the light conductive member 6 on a face 6b opposite to a transparent substrate opposing face 6a, and light emitted from the spot-like light source 7 is incident on the one end face 3 of the transparent substrate 2 in a substantially uniform manner. The depth of the grooves 9 triangular in section is in proportion to the increase in distance from the spot-like light source 7 being able to unify the light.

In order to improve the light utilization efficiency of the light conductive member 6, a frame 10 which is substantially U-shaped in section and has a light reflection member (not shown) inside thereof covers a surface of the light conductive member 6 except the transparent substrate opposing face 6a and also covers a proximal portion (a part on the end face 3 side) of the transparent substrate 2 thus collecting light beams leaked from the light conductive member 6.

In addition, the frame 10 also works not to detach the light conductive member 6 from the transparent substrate 2 with a specified strength. In order to reliably integrate the light conductive member 6 with the transparent substrate 2, the width L1 of the frame 10 is wider at least by 1 to 3 mm than the width L2 of the light conductive member 6 thereby covering the proximal portion of the transparent substrate 2.

Accordingly, in the spread illuminating apparatus 1 in FIG. 4, the width L1 of the frame 10 is set to be 4 to 6 mm while the width L2 of the light conductive member 6 is 3 mm.

In the spread illuminating apparatus described above, the market thereof demands for obtaining a larger size of the liquid crystal screen as possible. Meeting the above demand, the frame covering portion over the liquid crystal screen should be as small as possible to the contrary. Thus, the reduction of the width L1 for the frame 10 will be one of the options to achieve the larger liquid crystal screen.

However, if the width L1 of the frame 10 is reduced as described above, the portion of the frame 10 overlapped with the transparent substrate 2 is reduced accordingly, whereby the required strength for integrating the light conductive member 6 with the transparent substrate 2 will be insufficient and not satisfy the recent demand.

SUMMARY OF THE INVENTION

The present invention has been made in light of the above problems, and the object thereof is to provide a spread illuminating apparatus in which a portion covering a liquid crystal screen is reduced to a minimum while surely integrating a light conductive member with the transparent substrate.

In order to solve the above problems, according to a first aspect of the present invention, there is provided a spread illuminating apparatus including a rectangular transparent substrate made of a light transmissible material, in which a bar-like light source comprising a bar-like light conductive member made of a transparent material and a spot-like light source disposed on one end face of the light conductive member is disposed along one end face of the rectangular transparent substrate and a frame is held on the transparent substrate so as to cover the light conductive member, wherein the light conductive member is wedge-shaped such that a width of one end thereof facing a spot-like light source is larger than a width of the other end opposite the one end; and the transparent substrate is structured such that one end thereof facing the light conductive member is inclined and has an inclination angle forming an obtuse angle with respect to one side thereof aligned to the one end of the light conductive member facing the spot-like light source.

According to a second aspect of the present invention, in the spread illuminating apparatus according to the first aspect of the present invention, the inclination angle of the transparent substrate is set to be substantially supplementary to the light conductive member inclination angle which is formed by one side of the light conductive member facing the transparent substrate with respect to the one end face facing the spot-like light source.

According to a third aspect of the present invention, in the spread illuminating apparatus according to the first or second aspect of the present invention, one light source is provided, and wherein the transparent substrate is trapezoid-shaped such that one side thereof aligned to the one end of the light conductive member facing the spot-like light source is shorter than the other side opposite to the one side.

According to a fourth aspect of the present invention, in the spread illuminating apparatus according to the first or second aspect of the present invention, two light sources are provided, and each of the two light sources is disposed along each of both ends of the transparent substrate opposite to each other.

According to a fifth aspect of the present invention, in the spread illuminating apparatus according to the fourth aspect of the present invention, respective one ends of respective light conductive members of the two light sources, which face respective spot-like light sources, are located to be aligned to one same side of the transparent substrate, and the transparent substrate is trapezoid-shaped.

According to a sixth aspect of the present invention, in the spread illuminating apparatus according to the fourth aspect of the present invention, respective one ends of respective light conductive members of the two light sources, which face respective spot-like light sources, are located to be aligned to respective sides of said transparent substrate opposite to each other, and the transparent substrate is parallelogram-shaped.

DESCRIPTION OF THE PREFERRED EMBODIMENTS

Figure 4:
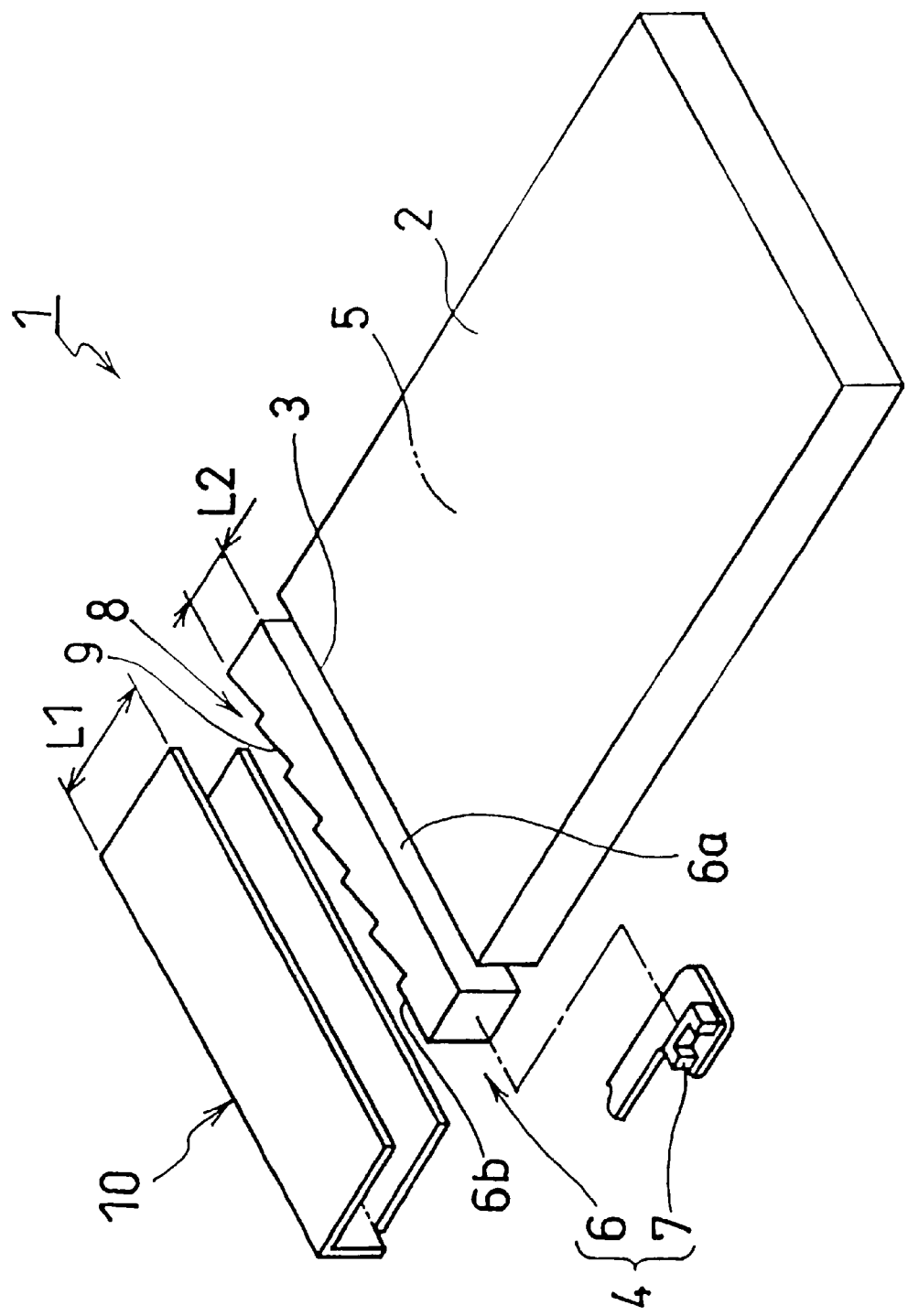
FIG. 4 is an exploded perspective view of an example of a conventional spread illuminating apparatus.

A preferred embodiment of the present invention for an illuminating apparatus 1A will be hereinafter described with reference to FIG. 1. The components identical with or corresponding to those in FIG. 4 are represented by the same reference numerals, and detailed description thereof is omitted.

Figure 1:
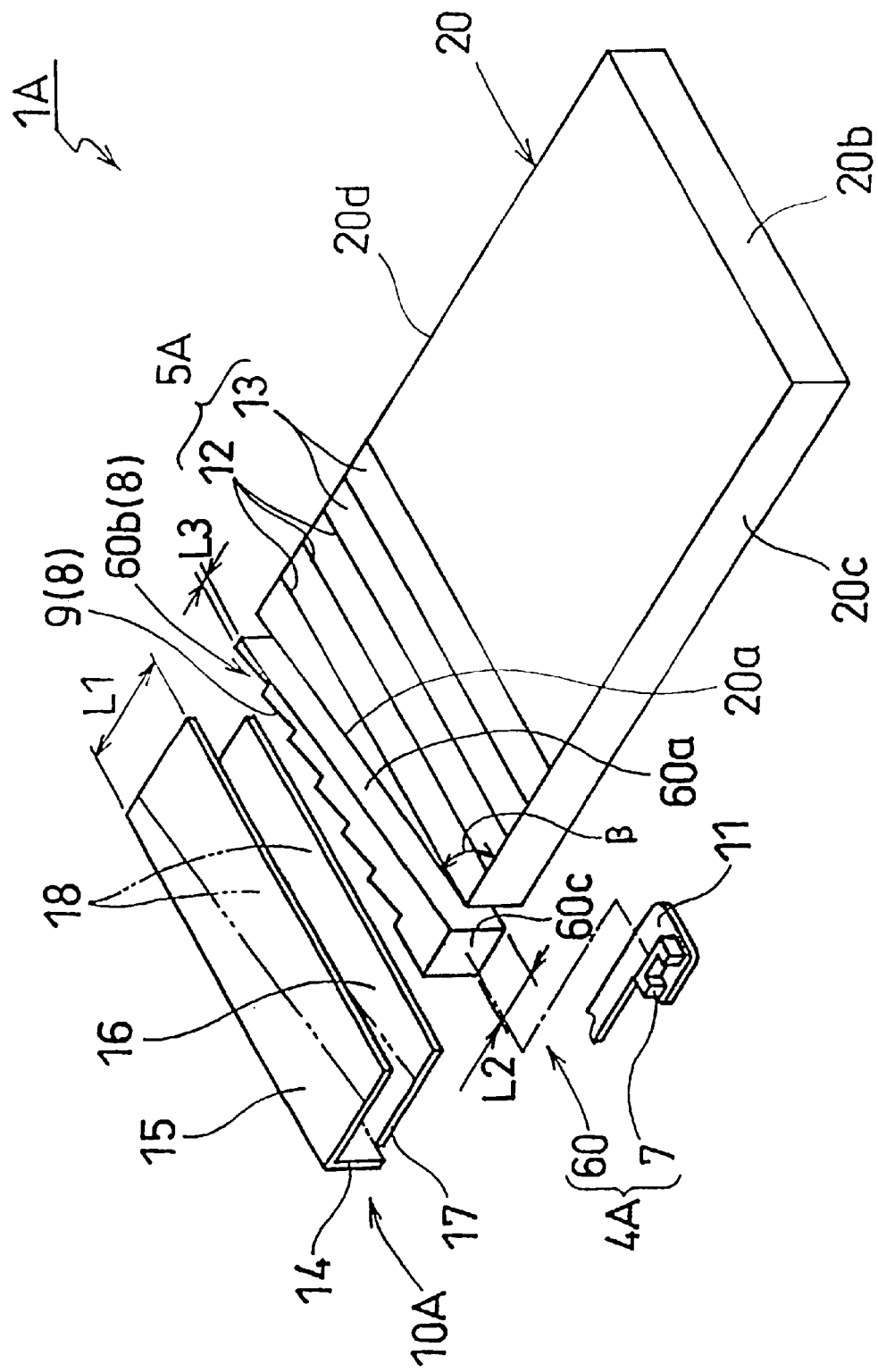
FIG. 1 is an exploded perspective view of a spread illuminating apparatus according to an embodiment of the present invention.

This spread illuminating apparatus 1A generally comprises a substantially trapezoidal transparent substrate 20 made of a light-transmissible material, a bar-like light source 4A disposed close to one end face 20a of the transparent substrate 20, and a frame 10A substantially U-shaped in its section which is formed of a metal such as stainless steel, of specified wall thickness and has appropriate rigidity and spring property as illustrated in FIG. 1, and is disposed so as to cover an observation surface of a reflection type liquid crystal device (not shown) and used as its auxiliary illumination.

The light source 4A generally comprises a wedge-like and bar-like (long square prismatic) light conductive member 60 made of a transparent material, and a spot-like light source 7 comprising a light emitting diode disposed on the one end face of the light conductive member 60 (hereinafter, referred to as the "spot-like light source opposing face") 60c. The spot-like light source 7 is mounted on a Flexible Printed Circuit (FPC) 11.

The light conductive member 60 is wedge-shaped, and the width thereof is in inverse proportion to the increase in distance from the spot-like light source opposing face 60c. This means that the light conductive member 60 is wedge-shaped in which the side of the spot-like light source opposing face 60c is the thickest. In the present embodiment, the width L2 of the spot-like light source opposing face 60c (the side on which the spot-like light source 7 is disposed) of the light conductive member 60 is set to 3 mm, while the width L3 of a face opposite to the spot-like light source opposing face 60c of the light conductive member 60 is set to 0.1 to 1.0 mm. A face (a transparent substrate opposing face) 60a opposing the transparent substrate 20 and a face 60b opposite to the transparent substrate opposing face 60a may be orthogonal to the spot-like light source opposing face 60c, or the angle formed by the transparent substrate opposing face 60a and the spot-like light source opposing face 60c (hereinafter, referred to as the light conductive member inclination angle) may form an acute angle with a prescribed value.

An optical path conversion means 8 comprising a large number of grooves 9 substantially triangular in section and formed in the longitudinal direction of the light conductive member 60 is provided on the face 60b opposite to the transparent substrate opposing face 60a of the light conductive member 60 in such a manner that light emitted from the spot-like light source 7 uniformly enters the one end face 20a of the transparent substrate 20.

The transparent substrate 20 is formed in a trapezoid in which one side 20c aligned to the spot-like light source opposing face 60c is shorter than an other side 20d opposite to the one side 20c.

A light reflection pattern 5A is formed on a surface of the transparent substrate 20 (an upper side in FIG. 1). The light reflection pattern 5A comprises a large number of grooves 12 and flat portions 13 formed therebetween. The grooves 12 substantially triangular in section are extended parallel to the optical axis of the bar-like light source 4A (orthogonal to the side part 20c), and a large number of grooves are formed from the one end face 20a of the transparent substrate 20 to an other face 20b opposite to the one end face 20a. The grooves 12 are set to be deeper from the one end face 20a to the other face 20b of the transparent substrate 20.

The angle formed by the one end face 20a and the one side 20c of the transparent substrate 20 (hereinafter referred to as the transparent substrate inclination angle $\beta$) is set to be an obtuse angle. Thus, when the light conductive member 60 is abutted onto the transparent substrate 20 in such a manner that the one end face 20a of the transparent substrate 20 faces the transparent substrate opposing face 60a, the whole shape comprising the substantially trapezoidal transparent substrate 20 and the wedge-shaped light conductive member 60 fitted to each other becomes substantially rectangular.

The frame 10A generally comprises a frame body part 14 opposite to the one end face 20a of the transparent substrate 20 with the light conductive member 60 therebetween, and two plates which are continuous to and substantially orthogonal to the frame body part 14 and disposed opposite to each other so as to hold a part on the one end face 20a side of the transparent substrate 20 (the upper and lower plates in FIG. 1 are hereinafter referred to as an upper opposing plate 15 and a lower opposing plate 16, respectively). A notch 17 is formed in an end part on the spot-like light source 7 side on the lower opposing plate 16 of the frame 10A so that the spot-like light source 7 can be disposed. The width L1 of the frame 10A is set to 3.5 mm.

A light reflection member (not shown) is provided on the frame body part 14 of the frame 10A, the upper opposing plate 15, and the lower opposing plate 16 so as to collect leaked light. The frame 10A is formed of a metal, excellent in machinability, and appropriate in rigidity and spring property.

In the transparent substrate 20 and the light conductive member 60, the one end face 20a and the transparent substrate opposing face 60a are abutted on each other, and the frame 10A is held into a proximal portion (a part on the side of the one end face 20a) of the transparent substrate 20 so as to cover the light conductive member 60 in such a manner that the whole shape of the substantially trapezoidal transparent substrate 20 and the wedge-shaped light conductive member 60 are fitted to substantially form a rectangular. The frame 10A has both rigidity and spring property as described above, and thus, the transparent substrate 20 is integrated with the light conductive member 60 thereby.

The light conductive member 60 is integrated with the transparent substrate 20 by means of the frame 10A in such a manner as to extend the frame 10A (the upper opposing plate 15 and the lower opposing plate 16) toward the transparent substrate 20 to overlapping. And, the integration becomes more secure the more an overlapping part (an overlapping part of the frame 10A and the transparent substrate 20) 18 extends over the transparent substrate 20.

As described above, in the light conductive member 60, a spot-like light source opposing face 60C facing the spot-like light source is wedge-shaped such that a width of one end face thereof is larger than a width of the other end opposite the one end, and the transparent substrate 20 has a transparent substrate inclination angle β in which the one end face 20a opposing the light conductive member 60 is inclined and has an inclination angle forming an obtuse angle with respect to one side 20c of the transparent substrate 20. Thus, when the light conductive member 60 is abutted on the transparent substrate 20, a part on the other side part 20d side is brought closer to the counter transparent substrate opposing face 60b (i.e., a surface part opposing the frame body part 14 when the frame 10A is assembled) of the light conductive member 60 than a part on one side part 20c side with respect to a part on the one end face 20a side of the transparent substrate 20, whereby the frame and transparent substrate overlapping part 18 can be widely secured irrespective of the spot-like light source opposing face 60C side formed into the thick wedge-shaped. Accordingly, the integrated strength of the light conductive member 60 with the transparent substrate 20 can be increased by means of the frame 10A.

In the present embodiment, the width L1 of the frame 10A is set to be 3.5 mm, the width L2 of the spot-like light source opposing face 60c of the light conductive member 60 is set to be 3 mm, and the width L3 of the face opposite to the spot-like light source opposing face 60c of the light conductive member 60 is set to be 0.1 to 0.8 mm. Thus, when the frame 10A is held with the light conductive member 60 abutted on the transparent substrate 20, the frame and transparent substrate overlapping part 18 can sufficiently extend toward the transparent substrate 20 so that the light conductive member 60 and the transparent substrate 20 can be securely integrated with the frame 10A.

In case the light conductive member inclination angle of the light conductive member 60 has a supplementary relation to the transparent substrate inclination angle β of the transparent substrate 20, the frame and transparent substrate overlapping part 18 are formed into a longitudinal trapezoid which becomes wider from one side part 20c to the other side part 20d on condition that the light conductive member 60 is abutted to the transparent substrate 20. Accordingly, the frame as a whole becomes wider enough sufficiently obtaining the strength to integrate the light conductive member 60 with the transparent substrate 20.

As described above, in the spread illuminating apparatus 1A, the width L1 of the frame 10A is set to be 3.5 mm shorter than the aforementioned prior art (the width L1 is 4 to 6 mm), and thus, the so-called frame covering the liquid crystal screen is narrower resulting in wider liquid crystal screen.

As described, the present invention has the shorter width L1 compared to the prior art; however, sufficiently large area of the frame and transparent substrate overlapping part 18 can be obtained as described above, whereby the strength for integrating the light conductive member 60 with the transparent substrate 20 can be ensured.

In the present embodiment, the width L1 of the frame 10A is set to be larger (3.5 mm) than the width L2 (3 mm) of the spot-like light source opposing face 60c; however, the present invention is not limited thereto. For example, the width L1 of the frame 10A may be set to be equal to the width L2 (3 mm) of the spot-like light source opposing face 60c (L1=3 mm) or the dimension exceeding this value (3 mm<L1<3.5 mm), or may be a value exceeding 3.5 mm (3.5 mm<L1). Further, the width L1 of the frame 10A may be set to the value below 3 mm if the strength for integrating the light conductive member 60 with the transparent substrate 20 is ensured.

And, the area of the liquid crystal screen can be increased compared with the above embodiment by setting the width L1 of the frame 10A to be the dimension below 3.5 mm.

Further, in the above-described embodiment, the width L2 of the spot-like light source opposing face 60c and the width L3 of the face opposite thereto are set to be the above-described dimensions (L2=3 mm, and L3=0.1 to 1.0 mm); however, the present invention is not limited thereto. When the value of the width L2 is changed from the above-described value (L2=3 mm), the width L1 of the frame 10A is preferably changed to the value equivalent to or larger than the width L2 accordingly.

In the above embodiment, the light conductive member inclination angle of the light conductive member 60 has a supplementary relation to the transparent substrate inclination angle β of the transparent substrate 20; however, the present invention is not limited thereto, and both angles may be set to be substantially supplementary to each other. This is applicable to examples shown in FIGS. 2 or 3 as described below.

Further, in the above-described first embodiment, the light conductive member inclination angle of the light conductive member 60 is set to have an acute angle; however, the present invention is not limited thereto, and the inclination angle may be set to be a right angle or an obtuse angle. This is applicable to examples shown in FIGS. 2 or 3 as described hereinafter.

Further, in the above-described embodiment, a case where the light conductive member 60 is disposed along the one end face 20a of the transparent substrate 20; however, the light conductive member 60 may be respectively disposed on the end faces 20a and 20b of the transparent substrate 20.

Figure 2:
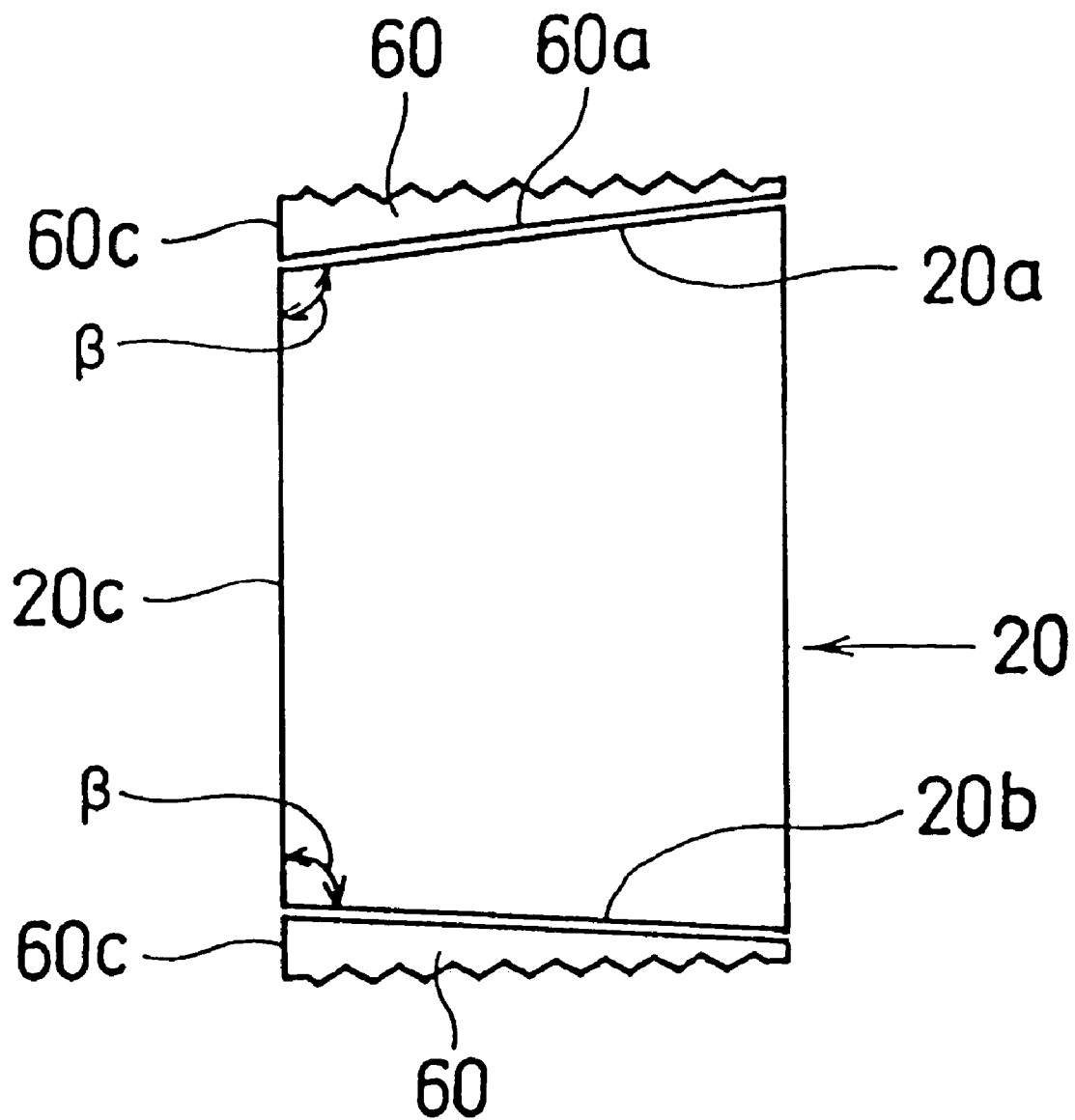
FIG. 2 is a schematic plan view of a spread illuminating apparatus having two light sources with a trapezoidal transparent substrate.

In this case, as shown in FIG. 2, the spot-like light source opposing faces 60c of two light conductive members 60 may be disposed on one side part 20c side by forming the transparent substrate 20 into trapezoid.

Figure 3:
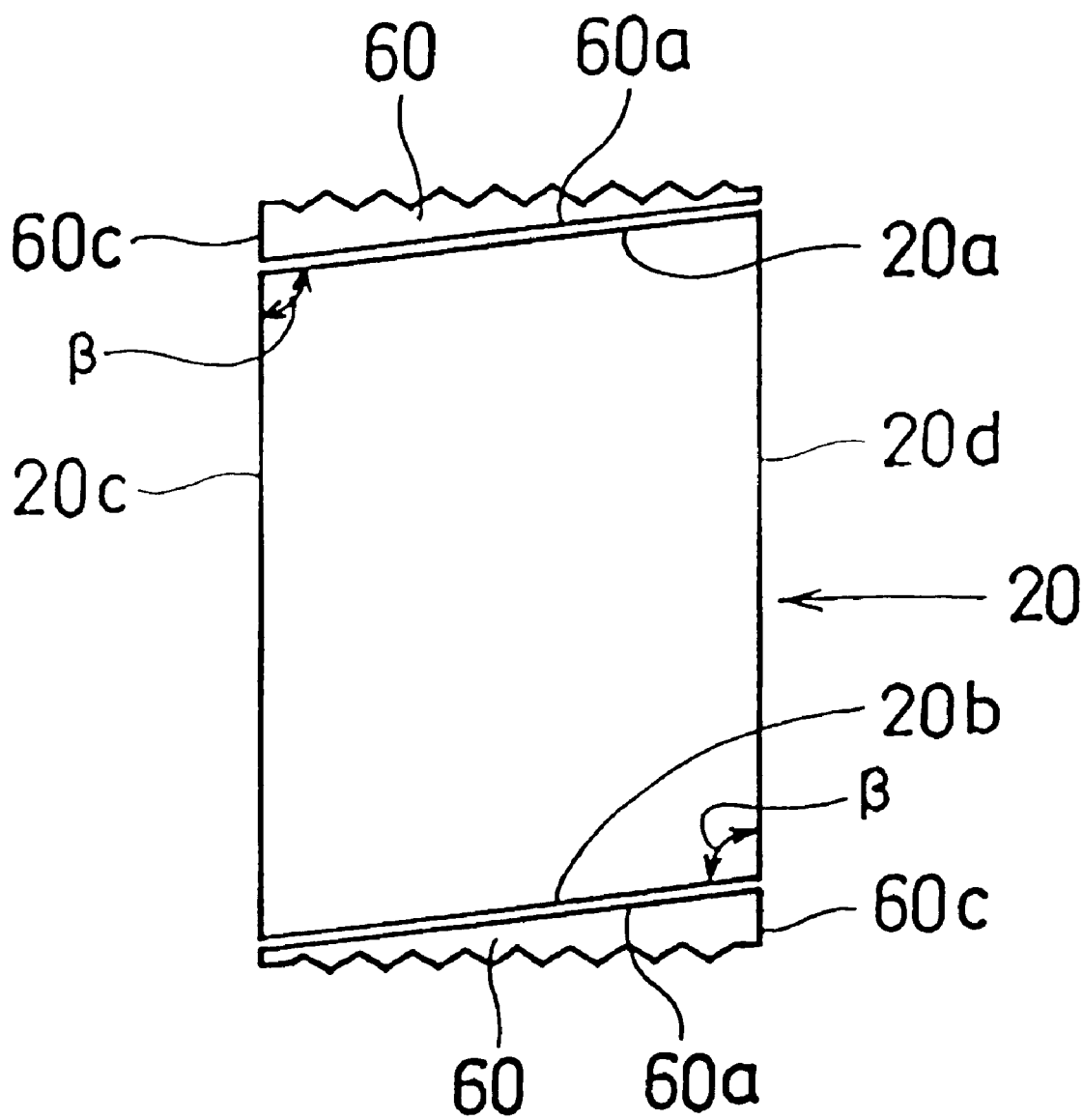
FIG. 3 is a schematic plan view of a spread illuminating apparatus having two light sources with a parallelogram transparent substrate.

Further, as shown in FIG. 3, one spot-like light source opposing face 60c (an upper side in FIG. 3) of two light conductive members 60 may be disposed on one side part 20c side, and the other spot-like light source opposing face 60c (a lower side in FIG. 3) may be disposed on the other side part 20d side (in this example, the one side part 20c and the other side part 20d constitute the side parts opposite to each other of the transparent substrate) by forming the transparent substrate 20 into parallelogram.

In the above-described embodiment, the spot-like light source 7 uses a light emitting diode; however, the present invention is not limited thereto, and, for example, the spot-like light source may be an incandescent lamp which can be lit at relatively low voltage.

In the above-described embodiment, a case where the grooves 9 of the optical path conversion means 8 and the grooves 12 of the light reflection pattern 5A are substantially triangular in section; however, the present invention is not limited thereto, and the grooves may be substantially trapezoidal or stepped in section.

According to the present invention, the light conductive member is wedge-shaped such that a width of the spot-like light source opposing face side is larger than a width of the other end side, and in the transparent substrate, the one end face facing the light conductive member is inclined and has an inclination angle forming the obtuse angle with respect to the side aligned to the spot-like light source opposing face, and thus, when the light conductive member is abutted on the transparent substrate, the one end face of the transparent substrate corresponding to the L3 side of the light conductive member is made closer to the face opposite to the transparent substrate opposing face of the light conductive member than the one end face of the transparent substrate corresponding to the L2 side. Therefore, the part of the frame overlapping the transparent substrate can be increased irrespective of that the light conductive member has the spot-like light source opposing face side being thicker so as to improve the strength for integrating the light conductive member with the transparent substrate by the frame thus constructed.

By making the transparent substrate inclination angle substantially supplementary to the light conductive member inclination angle, the frame and transparent substrate overlapping part are formed into a longitudinal triangle or trapezoid shape becoming wider from one side part to the other of the transparent substrate when the light conductive member is abutted on the transparent substrate. And, the width of the frame will be wide enough to obtain the strength integrating the light conductive member with the transparent substrate.

In addition, even when the width of the frame is reduced compared with that of the prior art, the overlapping part is still large enough, and, at the same time, the so-called frame covering the liquid crystal screen is reduced due to the reduction of the width of the frame so as to provide the wider liquid crystal screen.

What is claimed is:

1. A spread illuminating apparatus, which includes a Four-sided polyon transparent substrate made of a light transmissible material, a bar-like light source comprising a bar-like light conductive member made of a transparent material and a spot-like light source disposed on one end face of said light conductive member, and disposed along one end face of said transparent substrate, and which includes a frame held on said transparent substrate so as to cover said light conductive member, wherein said light conductive member is wedge-shaped such that a width of one end thereof facing said spot-like light source is larger than a width of the other end opposite said one end, and wherein said transparent substrate is structured such that one end thereof facing said light conductive member is inclined and has an inclination angle forming an obtuse angle with respect to one side thereof aligned to said one end of said light conductive member facing said spot-like light source.

2. A spread illuminating apparatus according to claim 1, wherein said inclination angle of said transparent substrate is set to be substantially supplementary to a light conductive member inclination angle which is formed by one side of said light conductive member facing said transparent substrate with respect to said one end thereof facing said spot-like light source.

3. A spread illuminating apparatus according to claim 1, wherein one light source is provided, and wherein said transparent substrate is trapezoid-shaped such that said one side thereof aligned to said one end of said light conductive member facing said spot-like light source is shorter than the other side opposite to said one side.

4. A spread illuminating apparatus according to claim 1, wherein two light sources are provided, and wherein each of said two light sources is disposed along each of both ends of said transparent substrate opposite to each other.

5. A spread illuminating apparatus according to claim 4, wherein respective one ends of respective light conductive members of said two light sources, which face respective spot-like light sources, are located to be aligned to one same side of said transparent substrate, and wherein said transparent substrate is trapezoid-shaped.

6. A spread illuminating apparatus according to claim 4, wherein respective one ends of respective light conductive members of said two light sources, which face respective spot-like light sources, are located to be aligned to respective sides of said transparent substrate opposite to each other, and wherein said transparent substrate is parallelogram-shaped.

7. A spread illuminating apparatus according to claim 2, wherein one light source is provided, and wherein said transparent substrate is trapezoid-shaped such that said one side thereof aligned to said one end of said light conductive member facing said spot-like light source is shorter than the other side opposite to said one side.

8. A spread illuminating apparatus according to claim 2, wherein two light sources are provided, and wherein each of said two light sources is disposed along each of both ends of said transparent substrate opposite to each other.

* * * * *